United States Patent
Adams et al.

(10) Patent No.: US 7,543,160 B2
(45) Date of Patent: Jun. 2, 2009

(54) SYSTEM AND METHOD FOR GENERATING A SECURE STATE INDICATOR ON A DISPLAY

(75) Inventors: Neil P. Adams, Waterloo (CA); Michael S. Brown, Waterloo (CA); Herbert A. Little, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 806 days.

(21) Appl. No.: 10/933,234

(22) Filed: Sep. 3, 2004

(65) Prior Publication Data

US 2006/0053306 A1    Mar. 9, 2006

(51) Int. Cl.
  H04K 1/00    (2006.01)
  G06F 12/14   (2006.01)
  H04L 9/32    (2006.01)
(52) U.S. Cl. .................. 713/193; 713/183; 713/190
(58) Field of Classification Search .......... 713/190, 713/183
  See application file for complete search history.

(56) References Cited

U.S. PATENT DOCUMENTS

| 6,064,387 | A  | * | 5/2000 | Canaday et al. ............. 715/839 |
| 6,704,489 | B1 | * | 3/2004 | Kurauchi et al. ............. 386/46 |
| 2003/0097596 | A1 | | 5/2003 | Muratov et al. |
| 2004/0005912 | A1 | | 1/2004 | Hubbe et al. |
| 2004/0117651 | A1 | | 6/2004 | Little et al. |
| 2004/0121823 | A1 | | 6/2004 | Noesgaard et al. |
| 2004/0266395 | A1 | * | 12/2004 | Pailles et al. ............... 455/411 |

FOREIGN PATENT DOCUMENTS

| EP | 1 107 623  | 6/2001 |
| EP | 1 357 727  | 10/2003 |
| JP | 6216841    | 8/1994 |
| KR | 2003-39034 | 5/2003 |
| WO | WO 01/26401 | 4/2001 |

OTHER PUBLICATIONS

Australian Notice of Acceptance. Application No. 2005202989. Date: Nov. 15, 2007.
Korean Examination Report. Application No. 10-2005-0080580. Dated: Nov. 9, 2006.

(Continued)

*Primary Examiner*—Benjamin E Lanier
*Assistant Examiner*—Cordelia Kane
(74) *Attorney, Agent, or Firm*—Bereskin & Parr LLP (57) ABSTRACT

A system and method for generating a security indicator on a display of a computing device (e.g. a mobile device), to indicate when the computing device is in a secure state while locked. A determination is made (e.g. by a data protection system) as to whether at least some of the secure data stored on the computing device can be decrypted by any applications on the computing device, while the computing device is in the locked state. An icon or other identifier can be displayed to indicate that the secure state has been attained. In one embodiment, the secure state is considered to have been attained, if it is determined that all tickets that have been issued to applications on the computing device while the computing device was unlocked have been released, and any decrypted encryption keys that may be used to decrypt the secure data have been deleted.

12 Claims, 4 Drawing Sheets

OTHER PUBLICATIONS

Taiwan Examination Report. Application No. 094125599. Dated: Dec. 4, 2006.

Chinese Examination Report. Application No. 200510097807.2. Dated: Nov. 10, 2006.

Korean Notice of Decision for Final Rejection (with English translation). Application No. 10-2005-0080580. Dated: Apr. 13, 2007.

Preliminary Notice of Rejection of the IPO (Translation). Taiwanese Application No. 094125599. Date: Aug. 18, 2006.

European Communication under Rule 51 (4)EPC. Application No. 04104273.0. Date: Sep. 14, 2006.

Korean Notice of Decision for Patent. Application No. 10-2005-0080580. Dated: Jun. 5, 2008.

Korean Examination Report (English translation). Application No. 10-2005-0080580. Dated: Mar. 21, 2008.

* cited by examiner

FIG. 4B

SYSTEM AND METHOD FOR GENERATING A SECURE STATE INDICATOR ON A DISPLAY

FIELD OF THE INVENTION

The invention relates generally to data protection, and more specifically to the protection of data on computing devices, including mobile devices for example.

BACKGROUND OF THE INVENTION

Confidential or otherwise sensitive data is commonly stored on computing devices. Such data may include the contents of e-mail messages, contact information, and scheduler information associated with a user, for example. For larger computing devices such as desktop computers, physical safeguards may be implemented to prevent unauthorized access to the computing devices themselves, and accordingly, the data therein. However, handheld or mobile devices may be considered less secure, since they are more likely to be lost or stolen by virtue of their relatively small size. As a result, it is often desirable to protect sensitive data on mobile devices in order to prevent unauthorized parties from accessing such information, particularly after the devices are lost or stolen.

Most mobile devices provide device-locking functionality to prevent unauthorized third party use. A mobile device lock may be initiated manually by a user, or automatically after a pre-determined timeout period or upon insertion of the mobile device into a holster, for example. When a mobile device is in a locked state, access to the device is prevented until the user is successfully authenticated, by entering an appropriate device access password, for example.

SUMMARY OF THE INVENTION

In accordance with one security scheme, when the device is in a locked state, the data stored on the device (or a subset of data that has been designated as sensitive, for example) is encrypted. This provides additional security in that sensitive data cannot be retrieved in unencrypted form, in the event that a memory store is removed from the device, for example. Furthermore, applications executing on the device are prevented from accessing sensitive data when the data is encrypted, affording even greater security.

While a computing device such as a mobile device is locked, the device may be more specifically considered to be in a secure state, if data on the device (either all of the data on the device, or all the data on the device that has been designated as sensitive, for example, as may be configured) is encrypted, such that applications which might wish to access the data cannot decrypt the data for use. Embodiments of the invention are generally directed to a system and method for generating a security indicator on a display of the device, to indicate when a locked device is in such a secure state.

In one broad aspect of the invention, there is provided a method of generating a security indicator on a display of a computing device, wherein secure data is stored on the computing device, wherein the secure data, when encrypted, can be decrypted using at least one encryption key in decrypted form, and wherein the method comprises the steps of: detecting when the computing device attains a locked state; determining if any of the secure data can be decrypted by any of one or more applications residing on the computing device, while the computing device is in the locked state; displaying a first indicator if it is determined at the determining step that at least some of the secure data can be decrypted by at least one of the one or more applications while the computing device is in the locked state; and displaying a second indicator if it is determined at the determining step that none of the secure data can be decrypted by any of the one or more applications on the computing device while the computing device is in the locked state.

BRIEF DESCRIPTION OF THE DRAWINGS

For a better understanding of embodiments of the invention, and to show more clearly how it may be carried into effect, reference will now be made, by way of example, to the accompanying drawings in which.

DETAILED DESCRIPTION OF EMBODIMENTS OF THE INVENTION

Some embodiments of the invention make use of a mobile station. A mobile station is a two-way communication device with advanced data communication capabilities having the capability to communicate with other computer systems, and is also referred to herein generally as a mobile device. A mobile device may also include the capability for voice communications. Depending on the functionality provided by a mobile device, it may be referred to as a data messaging device, a two-way pager, a cellular telephone with data messaging capabilities, a wireless Internet appliance, or a data communication device (with or without telephony capabilities). A mobile device communicates with other devices through a network of transceiver stations.

Figure 1:
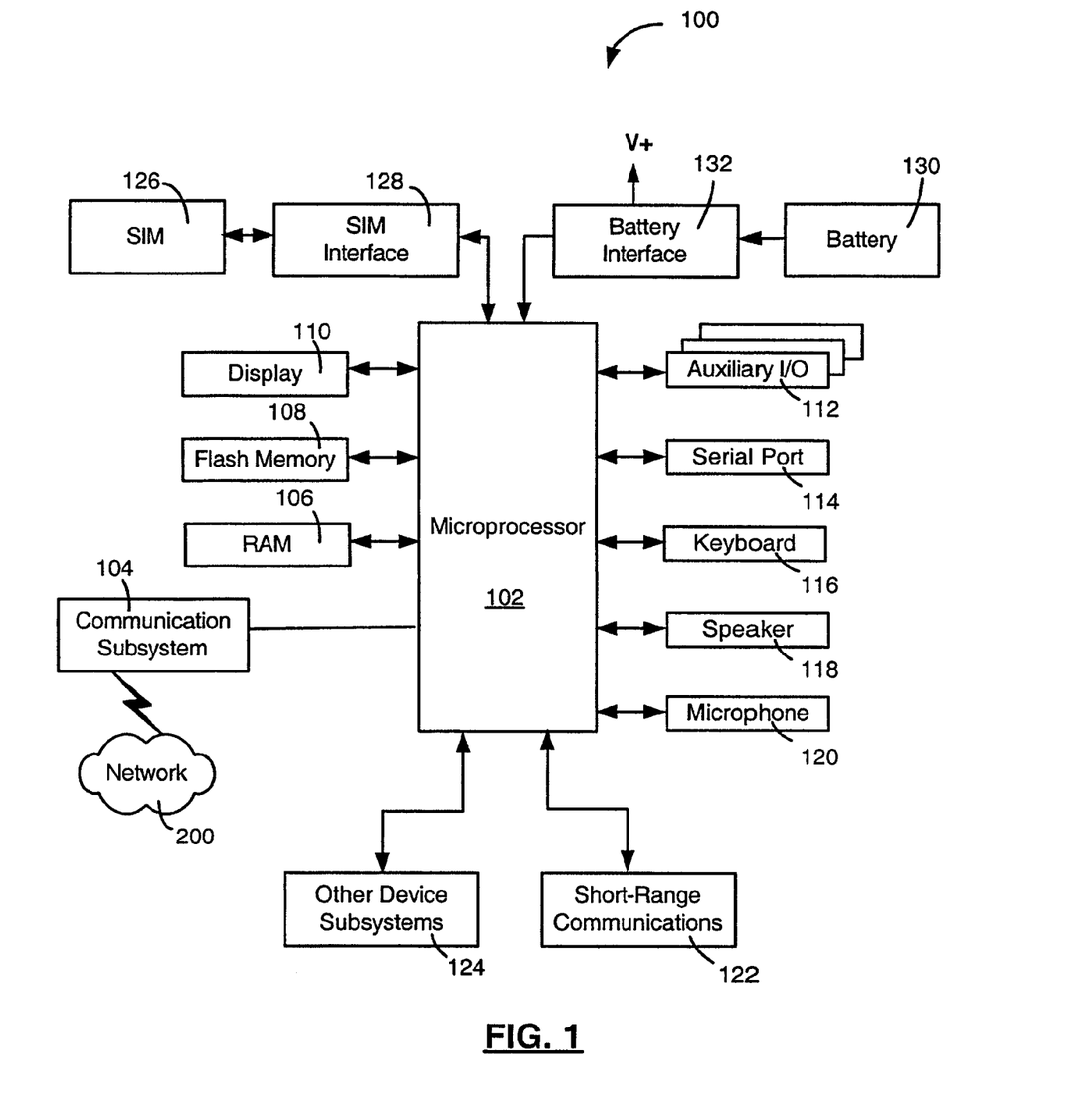
FIG. 1 is a block diagram of a mobile device in one example implementation.
Figure 2:
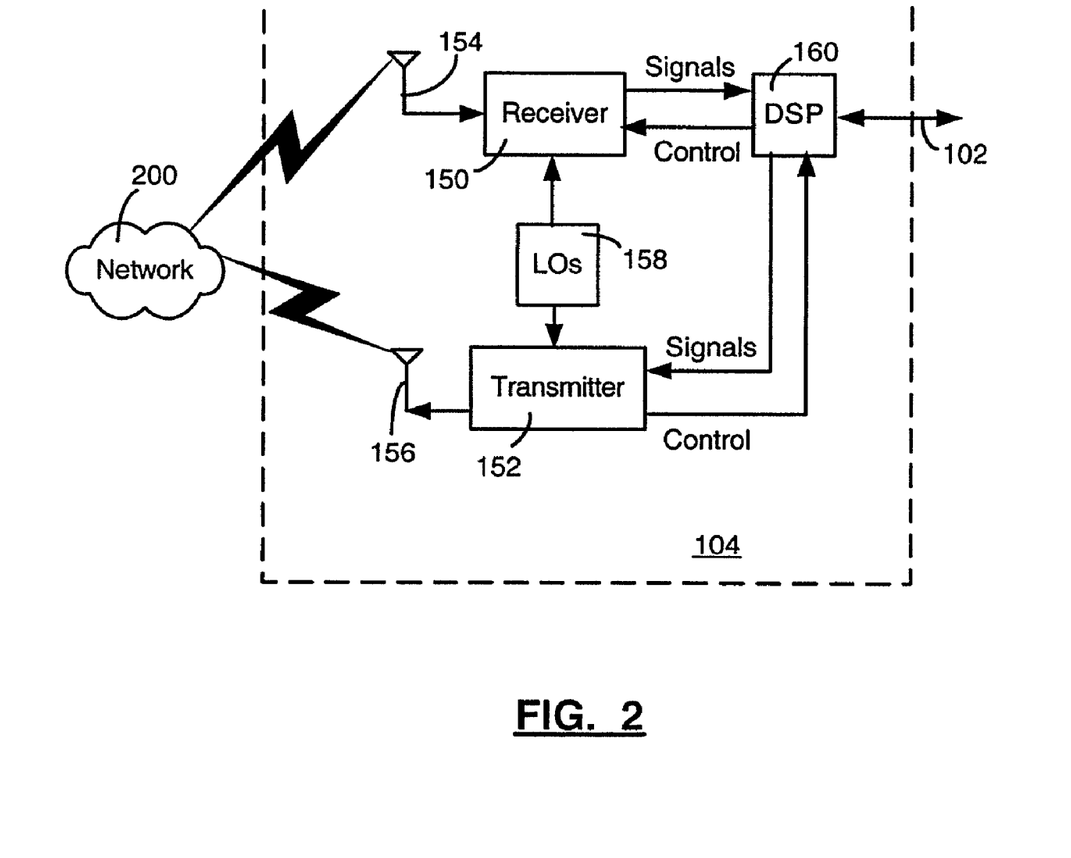
FIG. 2 is a block diagram of a communication subsystem component of the mobile device of FIG. 1.
Figure 3:
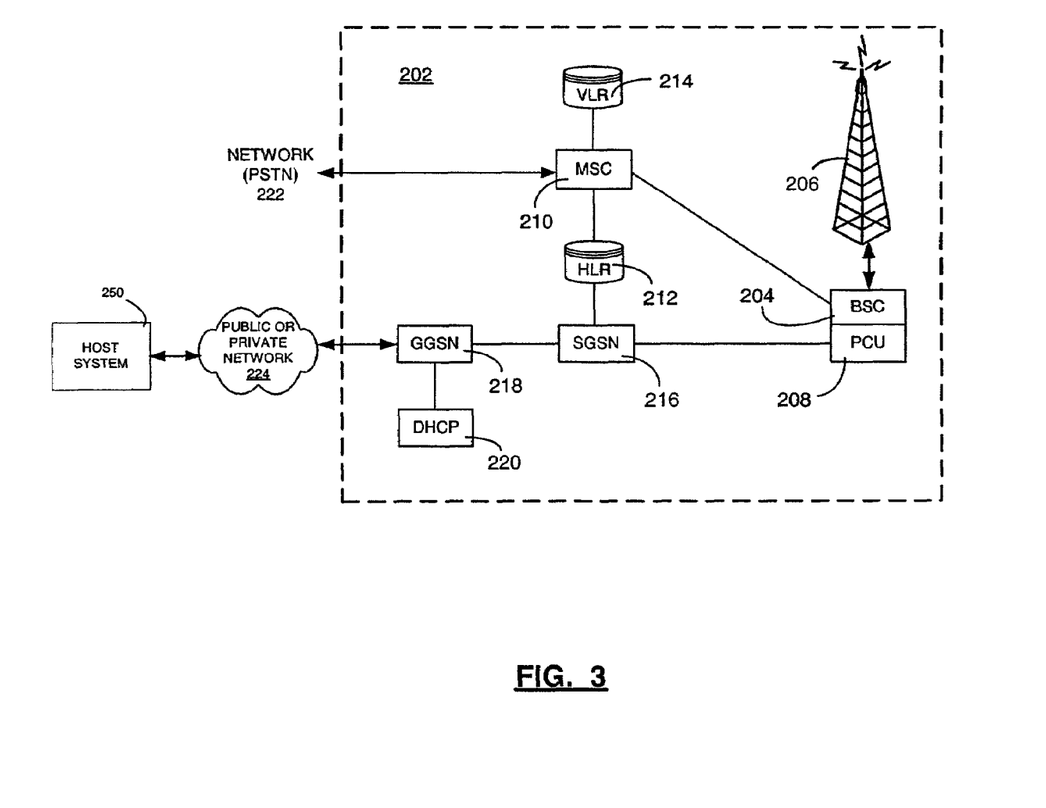
FIG. 3 is a block diagram of a node of a wireless network.

To aid the reader in understanding the structure of a mobile device and how it communicates with other devices, reference is made to FIGS. 1 through 3.

Referring first to FIG. 1, a block diagram of a mobile device in one example implementation is shown generally as 100. Mobile device 100 comprises a number of components, the controlling component being microprocessor 102. Microprocessor 102 controls the overall operation of mobile device 100. Communication functions, including data and voice communications, are performed through communication subsystem 104. Communication subsystem 104 receives messages from and sends messages to a wireless network 200. In this example implementation of mobile device 100, communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behaviour described herein, and it will also be understood by persons skilled in the art that the invention is intended to use any other suitable standards that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network associated with mobile device 100 is a GSM/GPRS wireless network in one example implementation of mobile device 100, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems.

Microprocessor 102 also interacts with additional subsystems such as a Random Access Memory (RAM) 106, flash memory 108, display 110, auxiliary input/output (I/O) subsystem 112, serial port 114, keyboard 116, speaker 118, microphone 120, short-range communications 122 and other devices 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, and device-resident functions such as a calculator or task list. Operating system software used by microprocessor 102 is typically stored in a persistent store such as flash memory 108, which may alternatively be a read-only memory (ROM) or similar storage element (not shown). Those skilled in the art will appreciate that the operating system, specific device applications, or parts thereof, may be temporarily loaded into a volatile store such as RAM 106.

Mobile device 100 may send and receive communication signals over network 200 after required network registration or activation procedures have been completed. Network access is associated with a subscriber or user of a mobile device 100. To identify a subscriber, mobile device 100 requires a Subscriber Identity Module or "SIM" card 126 to be inserted in a SIM interface 128 in order to communicate with a network. SIM 126 is one type of a conventional "smart card" used to identify a subscriber of mobile device 100 and to personalize the mobile device 100, among other things. Without SIM 126, mobile device 100 is not fully operational for communication with network 200. By inserting SIM 126 into SIM interface 128, a subscriber can access all subscribed services. Services could include: web browsing and messaging such as e-mail, voice mail, Short Message Service (SMS), and Multimedia Messaging Services (MMS). More advanced services may include: point of sale, field service and sales force automation. SIM 126 includes a processor and memory for storing information. Once SIM 126 is inserted in SIM interface 128, it is coupled to microprocessor 102. In order to identify the subscriber, SIM 126 contains some user parameters such as an International Mobile Subscriber Identity (IMSI). An advantage of using SIM 126 is that a subscriber is not necessarily bound by any single physical mobile device. SIM 126 may store additional subscriber information for a mobile device as well, including datebook (or calendar) information and recent call information.

Mobile device 100 is a battery-powered device and includes a battery interface 132 for receiving one or more rechargeable batteries 130. Battery interface 132 is coupled to a regulator (not shown), which assists battery 130 in providing power V+ to mobile device 100. Although current technology makes use of a battery, future technologies such as micro fuel cells may provide the power to mobile device 100.

Microprocessor 102, in addition to its operating system functions, enables execution of software applications on mobile device 100. A set of applications that control basic device operations, including data and voice communication applications, will normally be installed on mobile device 100 during its manufacture. Another application that may be loaded onto mobile device 100 would be a personal information manager (PIM). A PIM has functionality to organize and manage data items of interest to a subscriber, such as, but not limited to, e-mail, calendar events, voice mails, appointments, and task items. A PIM application has the ability to send and receive data items via wireless network 200. PIM data items may be seamlessly integrated, synchronized, and updated via wireless network 200 with the mobile device subscriber's corresponding data items stored and/or associated with a host computer system. This functionality creates a mirrored host computer on mobile device 100 with respect to such items. This can be particularly advantageous where the host computer system is the mobile device subscriber's office computer system.

Additional applications may also be loaded onto mobile device 100 through network 200, auxiliary I/O subsystem 112, serial port 114, short-range communications subsystem 122, or any other suitable subsystem 124. This flexibility in application installation increases the functionality of mobile device 100 and may provide enhanced on-device functions, communication-related functions, or both. For example, secure communication applications may enable electronic commerce functions and other such financial transactions to be performed using mobile device 100.

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

Short-range communications subsystem 122 provides for communication between mobile device 100 and different systems or devices, without the use of network 200. For example, subsystem 122 may include an infrared device and associated circuits and components for short-range communication. Examples of short range communication would include standards developed by the Infrared Data Association (IrDA), Bluetooth, and the 802.11 family of standards developed by IEEE.

In use, a received signal such as a text message, an e-mail message, or web page download will be processed by communication subsystem 104 and input to microprocessor 102. Microprocessor 102 will then process the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary subsystem 112 may include devices such as: a touch screen, mouse, track ball, infrared fingerprint detector, or a roller wheel with dynamic button pressing capability. Keyboard 116 is an alphanumeric keyboard and/or telephone-type keypad. A composed item may be transmitted over network 200 through communication subsystem 104.

For voice communications, the overall operation of mobile device 100 is substantially similar, except that the received signals would be output to speaker 118, and signals for transmission would be generated by microphone 120. Alternative voice or audio I/O subsystems, such as a voice message recording subsystem, may also be implemented on mobile device 100. Although voice or audio signal output is accomplished primarily through speaker 118, display 110 may also be used to provide additional information such as the identity of a calling party, duration of a voice call, or other voice call related information.

Referring now to FIG. 2, a block diagram of the communication subsystem component 104 of FIG. 1 is shown. Communication subsystem 104 comprises a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 is dependent upon the network 200 in which mobile device 100 is intended to operate, thus it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is a limited resource that must be conserved, typically due to limits in overall bandwidth and limited battery power of mobile device 100.

When mobile device 100 is fully operational, transmitter 152 is typically keyed or turned on only when it is sending to network 200 and is otherwise turned off to conserve resources. Similarly, receiver 150 is periodically turned off to conserve power until it is needed to receive signals or information (if at all) during designated time periods.

Referring now to FIG. 3, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with General Packet Radio Service (GPRS) and Global Systems for Mobile (GSM) technologies. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 also contains a Packet Control Unit (PCU) 208 that connects to SGSN 216 to control segmentation, radio channel allocation and to satisfy packet switched requirements. To track mobile device location and availability for both circuit switched and packet switched management, HLR 212 is shared between MSC 210 and SGSN 216. Access to VLR 214 is controlled by MSC 210.

Station 206 is a fixed transceiver station. Station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in HLR 212. HLR 212 also contains location information for each registered mobile device and can be queried to determine the current location of a mobile device. MSC 210 is responsible for a group of location areas and stores the data of the mobile devices currently in its area of responsibility in VLR 214. Further VLR 214 also contains information on mobile devices that are visiting other networks. The information in VLR 214 includes part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times and at the same time requiring less use of computing resources.

SGSN 216 and GGSN 218 are elements added for GPRS support; namely packet switched data support, within GSM. SGSN 216 and MSC 210 have similar responsibilities within wireless network 200 by keeping track of the location of each mobile device 100. SGSN 216 also performs security functions and access control for data traffic on network 200. GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring a DHCP server 220 connected to the GGSN 218. There are many mechanisms for dynamic IP assignment, including using a combination of a Remote Authentication Dial-In User Service (RADIUS) server and DHCP server. Once the GPRS Attach is complete, a logical connection is established from a mobile device 100, through PCU 208, and SGSN 216 to an Access Point Node (APN) within GGSN 218. The APN represents a logical end of an IP tunnel that can either access direct Internet compatible services or private network connections. The APN also represents a security mechanism for network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, network 200 will run an idle timer for each PDP Context to determine if there is a lack of activity. When a mobile device 100 is not using its PDP Context, the PDP Context can be deallocated and the IP address returned to the IP address pool managed by DHCP server 220.

Embodiments of the invention relate generally to data protection, and more specifically to the protection of data on computing devices. While embodiments of the inventions are described herein with reference to a mobile device, at least some of these embodiments may be implemented on computing devices other than mobile devices.

In one example implementation, a mobile device (e.g. mobile device 100 of FIG. 1) provides device-locking functionality to prevent unauthorized third party use. The mobile device lock may be initiated manually by a user, or it may be initiated automatically after a pre-determined timeout period or when the mobile device is inserted into a holster, for example.

In accordance with one security scheme, when mobile device 100 is in a locked state, data stored on the mobile device 100 (or a subset of data that has been designated as sensitive) is encrypted. This security scheme is applied by a data protection system residing on mobile device 100, in this example implementation. The data protection system may be implemented as a software module, application or utility that resides and is executed (e.g. by microprocessor 102 of FIG. 1) on mobile device 100. In a variant implementation, the data protection system may be implemented in hardware. The data protection system described herein need not be implemented in a separate module, and some or all of its functions may be integrated with that of one or more other applications or modules residing on mobile device 100 in variant implementations.

In mobile device 100, access to memory stores (e.g. in flash memory 108) is controlled by the data protection system. The data protection system encrypts data received for storage, stores encrypted data to memory, and decrypts stored data for components of mobile device 100. In one example implementation, read and write operations to and from the memory stores initiated by components of mobile device 100 are performed via the data protection system. In a variant implementation, components of mobile device 100 have direct access to the memory stores, and will interact with the data protection system only when data is to be encrypted for storage or when encrypted data needs to be decrypted for use.

For ease of exposition, the following description makes reference to the encryption and decryption by the data protection system of data generally, where protection for the data is desired. However, it will be understood by persons skilled in the art, that not all data to be stored need be secured in this manner. For example, only data that is related specifically to a user of mobile device 100 may be secured. Alternatively, specific data items or specific types of data may be designated as sensitive, either by a user or automatically by an application executing on mobile device 100, so that it may be secured in this manner. As a further example, only data stored in specified memory stores of mobile device 100 may be designated for protection. Other arrangements and configurations are possible in variant implementations.

In this example implementation, the data protection system may be enabled or disabled, such that data can only be encrypted and/or decrypted while the data protection system is enabled. Users may be permitted to enable and/or disable the data protection system. In a variant implementation, the data protection system may be enabled and/or disabled remotely, by an administrator for example, (and possibly in accordance with an information technology (IT) policy).

In operation, the data protection system accesses encryption keys in a key store residing in memory (e.g. flash memory 108 of FIG. 1). In one example implementation, at least one symmetric key that is used for the encryption and decryption of data to be secured is stored in the key store. In order to protect the encryption keys from unauthorized use, the keys are stored in the key store in encrypted form. An encryption key may subsequently be decrypted, upon correct entry of a user's device password for example. A copy of the decrypted key may then be stored in the key store, or in another memory (e.g. RAM 106 of FIG. 1) or cache so that it need not be decrypted each time it is needed. However, the decrypted symmetric key is subject to deletion when mobile device 100 is locked in this example implementation. The next time the mobile device 100 is unlocked (e.g. by a user entering the correct password), the encrypted symmetric key can then again be decrypted.

Furthermore, in accordance with the security scheme mentioned above, when mobile device 100 is in a locked state, the data to be secured (e.g. data that could be considered as sensitive) is encrypted. Since the mobile device lock can generally be initiated at any time, even when an application is in the process of performing an action that has not yet completed on certain data in a decrypted state (e.g. the sorting of secure data items), it may be desirable to allow such an application to complete the action in progress, rather than to have the data encrypted immediately upon the locking of the device so as to interrupt the action.

In order to facilitate such functionality, the data protection system of mobile device 100, for example, may be further adapted to issue "tickets" to applications seeking access to secure data. When an application needs to perform an action that requires access to secure data, the application can request a ticket from the data protection system. If mobile device 100 is in an unlocked state, the data protection system will immediately issue a ticket to the application. On the other hand, if mobile device 100 is in a locked state, the data protection system will not issue a ticket to the application, preventing access by the application to the secure data. The request may either be denied, such that the application would be required to repeat the request for a ticket when mobile device 100 subsequently becomes unlocked; alternatively, the data protection system may defer the issuance of the ticket in response to the original request until mobile device 100 subsequently becomes unlocked, at which time the ticket is automatically issued to the application.

So long as an application holds a valid ticket, the application will be permitted access to the secure data. Even if mobile device 100 becomes subsequently locked, the application will continue to have access to the secure data until the application releases the ticket. Applications are expected to use tickets only for a short period of time in order to complete an action, and to subsequently release the tickets when the action has been completed. In a variant implementation, tickets may be considered to be valid only for a specified time interval, after which time the tickets may be deemed to have been released.

The data protection system is adapted to keep track of each application that has been issued a ticket, but which has not yet released its ticket. While there are outstanding tickets, the encryption key needed to decrypt the secure data remains in the clear even if mobile device 100 becomes locked, since an application with a ticket is still entitled to access the secure data. However, once the data protection system determines that all of the issued tickets have been released while mobile device 100 is in a locked state, the copy of the decrypted encryption key is deleted. Accordingly, the secure data stored in encrypted form can no longer be decrypted by applications in this state, and mobile device 100 may be considered to be in a secure state.

Embodiments of the invention are generally directed to a system and method for generating a security indicator on a display of a computing device, to indicate when a locked device is in a secure state.

Figure 4A:
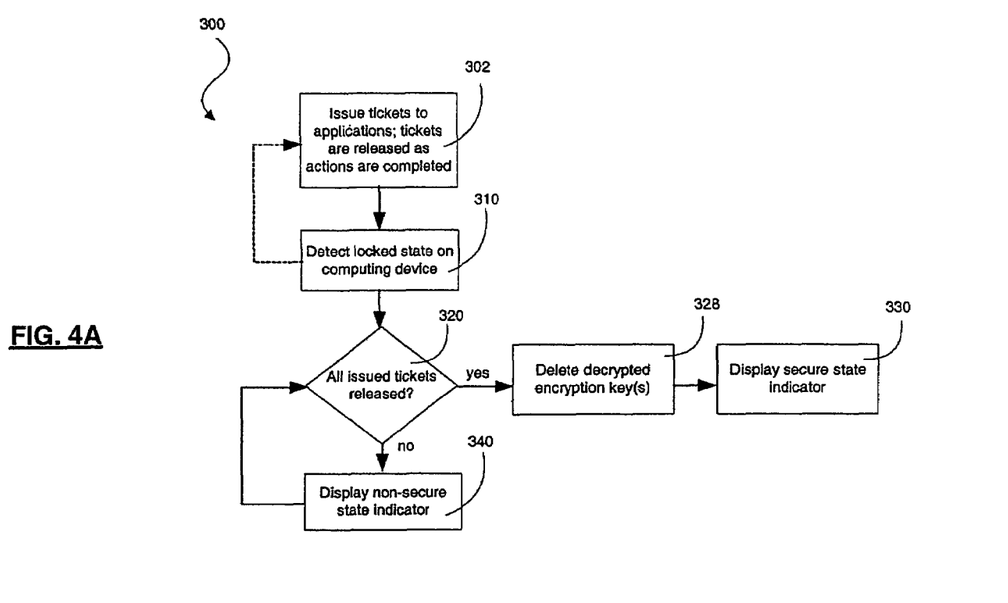
FIG. 4A is a flowchart illustrating steps in a method of generating a security indicator on a display in an embodiment of the invention.

Referring to FIG. 4A, a flowchart illustrating steps in a method of generating a security indicator on a display in an embodiment of the invention is shown generally as 300. This method facilitates user identification of when a computing device (e.g. mobile device 100 of FIG. 1) is in a secure state when locked.

As described above with reference to mobile device 100, in normal operation as shown at step 302, tickets are issued (e.g. by a data protection system executing on mobile device 100) while the computing device is in an unlocked state, to applications requesting access to secure data in order to perform an action on the secure data. These tickets may then be released when the action is completed.

At step 310, the data protection system detects when the computing device enters a locked state. The data protection system can continue to issue tickets (e.g. at step 302) so long as the computing device is in an unlocked state.

At step 320, the data protection system determines whether all applications that were issued a ticket while the computing device was in an unlocked state have since released their tickets. If so, any encryption keys in decrypted form that can be used by applications to access secure data are deleted at step 328, and a secure state indicator is displayed on the computing device at step 330.

In one embodiment, the secure state indicator displayed at step 330 is an icon resembling a locked padlock. Other secure state indicators may be employed in variant embodiments.

The secure state indicator is displayed so that it is clearly visible to the user when the device is securely locked. For example, the secure state indicator may be displayed on a ribbon banner in the computing device display.

The secure state indicator displayed at step 330 shows that the computing device is not merely locked to prevent unauthorized user access, but is locked and in a secure state (i.e. "securely locked"), such that applications on the computing device cannot access secure data (e.g. data that has been designated as sensitive). The secure state indicator remains displayed until the computing device returns to an unlocked state, or until access to secure data by applications is otherwise permitted.

If at step 320, the data protection system determines that not all applications that were issued a ticket while the computing device was in an unlocked state have released their tickets, an indicator indicating a non-secure state is displayed on the computing device at step 340.

In one embodiment, the non-secure state indicator displayed at step 340 is an icon resembling an unlocked padlock. Other non-secure state indicators may be employed in variant embodiments.

The non-secure state indicator is displayed so that it is clearly visible to the user when the device is locked, but not securely locked. For example, the non-secure state indicator may be displayed on a ribbon banner in the computing device display.

This non-secure state indicator displayed at step 340 shows that although the computing device is in a locked state, the computing device is not in a secure state since at least one application still has access to secure data, and may be able to decrypt secure data. Furthermore, the computing device may not be considered to be secure since the encryption key used to decrypt the secure data may still exist in a memory store in a decrypted state, which an attacker could potentially retrieve and use to decrypt the secure data. The status of the outstanding tickets can be monitored by repeating step 320, and the non-secure state indicator can remain displayed until a secure state on the computing device is detected, or alternatively until the computing device returns to an unlocked state or until access to secure data by applications is otherwise permitted.

Figure 4B:
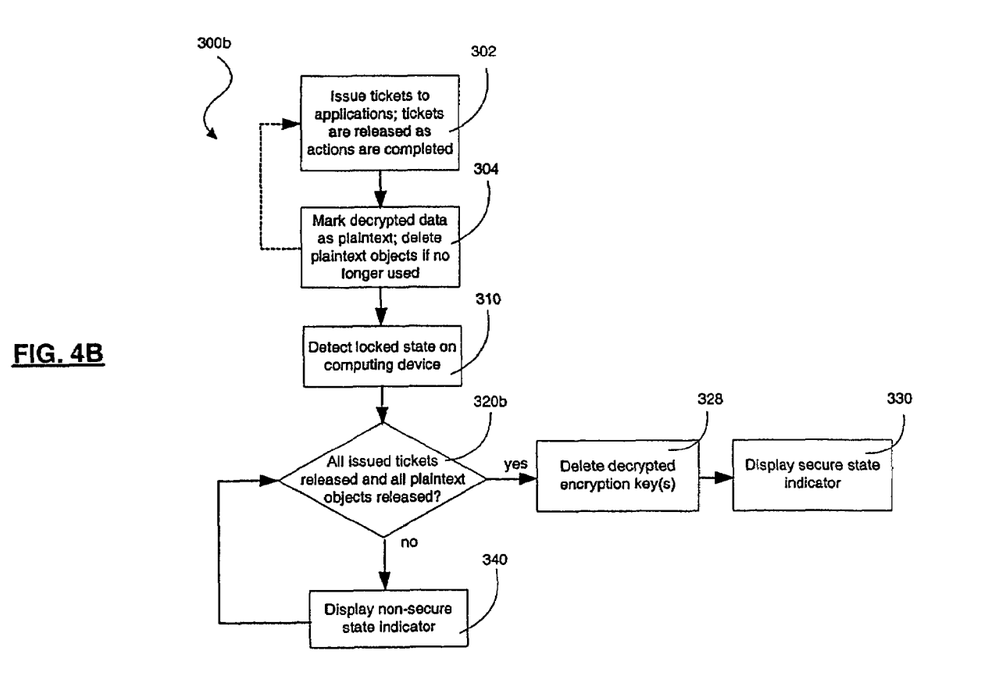
FIG. 4B is a flowchart illustrating steps in a method of generating a security indicator on a display in another embodiment of the invention.

Referring to FIG. 4B, a flowchart illustrating steps in a method of generating a security indicator on a display in an embodiment of the invention is shown generally as 300b. This method facilitates user identification of when a computing device (e.g. mobile device 100 of FIG. 1) is in a secure state when locked.

Method 300b is similar to method 300, except that method 300b may be applied in implementations where secure data, when decrypted, is marked as plaintext, for example. When an application requires access to secure data, the data protection system may decrypt the requisite secure data, store the decrypted data in memory, and mark the decrypted data as plaintext, as shown at step 304. Moreover, for greater security, when the computing device becomes locked, the data marked as plaintext (referred to herein generally as plaintext objects) should be deleted, by the data protection system for example. If persistent storage of a plaintext object is required and the object is not already stored in encrypted form, it may be encrypted by the data protection system after the computing device becomes locked. Applications with tickets that have not yet been released may be permitted to hold some plaintext objects until they are no longer needed, at which time the plaintext objects may be released (e.g. for deletion).

In this embodiment of the invention, the computing device is not considered to be in a secure state until (1) all applications that were issued a ticket while the computing device was in an unlocked state have released their tickets, and (2) all plaintext objects have been released. Accordingly, at step 320b, the data protection system determines whether both of these conditions are satisfied. If so, the secure state indicator is displayed at step 330. If not, the non-secure state indicator is displayed at step 340.

In a variant embodiment of the invention, criteria in addition to those described with reference to method 300 or method 300b may be established, in determining whether a computing device has attained a secure state. More than two states may also be defined and determined in variant embodiments.

In a variant embodiment of the invention, a third state indicator may be employed to denote a state where it is determined that (1) all applications that were issued a ticket while the computing device was in an unlocked state have released their tickets, and (2) all plaintext objects have not yet been released. In this embodiment, a tri-state icon denoting the three states (i.e. tickets exist and plaintext objects exist, no tickets exist but plaintext objects exist, neither tickets nor plaintext objects exist) may be employed, for example.

In a variant embodiment of the invention, the data protection system may be configurable to allow a secure state to be determined either in accordance with method 300 or with method 300b as may be configured at a particular time. The data protection system may be adapted to be configured (which may encompass modifications to an initial configuration) by a user, and/or by an administrator for example, possibly in accordance with an IT policy.

The steps of a method of generating a security indicator in embodiments of the invention may be provided as executable software instructions stored on computer-readable media, which may include transmission-type media.

The invention has been described with regard to a number of embodiments. However, it will be understood by persons skilled in the art that other variants and modifications may be made without departing from the scope of the invention as defined in the claims appended hereto.

The invention claimed is:

1. A method of generating a security indicator on a display of a computing device, wherein secure data is stored on the computing device, wherein the secure data, when encrypted, can be decrypted using at least one encryption key in decrypted form, and wherein the method comprises:
   detecting when the computing device attains a locked state in which access to the device is prevented until a user is successfully authenticated;
   determining if any of the secure data can be decrypted by any of one or more applications residing on the computing device while the computing device is in the locked state;
   displaying a first indicator if it is determined that at least some of the secure data can be decrypted by at least one of the one or more applications while the computing device is in the locked state; and
   displaying a second indicator if it is determined that none of the secure data can be decrypted by any of the one or more applications on the computing device while the computing device is in the locked state;
   wherein the method further comprises:
      issuing a ticket while the computing device is not in a locked state to each application requesting access to the secure data in order to perform an action, wherein each application is adapted to release the ticket issued thereto when the action is completed;
      deleting the at least one encryption key upon determining that all issued tickets have been released, such that none of the secure data can be decrypted by any of the one or more applications residing on the computing device;
      wherein said determining if any of the secure data can be decrypted by any of one or more applications residing on the computing device comprises determining whether all issued tickets have been released;
      for each of at least one application, marking a subset of the secure data as plaintext when the subset is decrypted for use by the respective application while the computing device is not in a locked state, wherein the respective application is adapted to delete the marked subset after use thereof; and
      determining that all marked subsets are deleted before the second indicator is displayed.

2. The method of claim 1, wherein the computing device is a mobile device.

3. The method of claim 1, wherein the first indicator is an icon resembling an unlocked padlock, and wherein the second indicator is an icon resembling a locked padlock.

4. The method of claim 1, further comprising displaying a third indicator if it is determined that all issued tickets have been released but not all of the marked subsets have been deleted.

5. A physical computer-readable medium comprising a plurality of instructions for execution on a computing device, wherein the instructions, when executed, cause a method of generating a security indicator on a display of the computing device to be performed comprising:
   detecting when the computing device attains a locked state in which access to the device is prevented until a user is successfully authenticated;
   determining if any of the secure data can be decrypted by any of one or more applications residing on the computing device while the computing device is in the locked state;
   displaying a first indicator if it is determined that at least some of the secure data can be decrypted by at least one of the one or more applications while the computing device is in the locked state; and
   displaying a second indicator if it is determined that none of the secure data can be decrypted by any of the one or more applications on the computing device while the computing device is in the locked state;
   wherein the method further comprises:
      issuing a ticket while the computing device is not in a locked state to each application requesting access to the secure data in order to perform an action, wherein each application is adapted to release the ticket issued thereto when the action is completed;
      deleting the at least one encryption key upon determining that all issued tickets have been released, such that none of the secure data can be decrypted by any of the one or more applications residing on the computing device;
      wherein said determining if any of the secure data can be decrypted by any of one or more applications residing on the computing device comprises determining whether all issued tickets have been released;
      for each of at least one application, marking a subset of the secure data as plaintext when the subset is decrypted for use by the respective application while the computing device is not in a locked state, wherein the respective application is adapted to delete the marked subset after use thereof; and
      determining that all marked subsets are deleted before the second indicator is displayed.

6. The computer-readable medium of claim 5, wherein the computing device is a mobile device.

7. The computer-readable medium of claim 5, wherein the first indicator is an icon resembling an unlocked padlock, and wherein the second indicator is an icon resembling a locked padlock.

8. The computer-readable medium of claim 5, wherein the method further comprises displaying a third indicator if it is determined that all issued tickets have been released but not all of the marked subsets have been deleted.

9. A data protection system for generating a security indicator on a display of a computing device, the data protection system comprising a processor, wherein secure data is stored on the computing device, wherein the processor is configured to decrypt secure data, when encrypted, using at least one encryption key in decrypted form, and wherein the processor is further configured to:
   detect when the computing device attains a locked state in which access to the device is prevented until a user is successfully authenticated;
   determine if any of the secure data can be decrypted by any of one or more applications residing on the computing device while the computing device is in the locked state;
   display a first indicator if it is determined that at least some of the secure data can be decrypted by at least one of the one or more applications while the computing device is in the locked state; and
   display a second indicator if it is determined that none of the secure data can be decrypted by any of the one or more applications on the computing device while the computing device is in the locked state;
   wherein the processor is further configured to:
      issue a ticket while the computing device is not in a locked state to each application requesting access to the secure data in order to perform an action, wherein each application is adapted to release the ticket issued thereto when the action is completed;
      delete the at least one encryption key upon determining that all issued tickets have been released, such that none of the secure data can be decrypted by any of the one or more applications residing on the computing device;
      for each of at least one application, mark a subset of the secure data as plaintext when the subset is decrypted for use by the respective application while the computing device is not in a locked state, wherein the respective application is adapted to delete the marked subset after use thereof; and
      determine that all marked subsets are deleted before the second indicator is displayed.

10. The data protection system of claim 9, wherein the computing device is a mobile device.

11. The data protection system of claim 9, wherein the first indicator is an icon resembling an unlocked padlock, and wherein the second indicator is an icon resembling a locked padlock.

12. The data protection system of claim 9, wherein the processor is further configured to display a third indicator if it is determined that all issued tickets have been released but not all of the marked subsets have been deleted.

* * * * *